(12) United States Patent
Hong et al.

(10) Patent No.: US 7,220,044 B2
(45) Date of Patent: May 22, 2007

(54) LIQUID CRYSTAL DISPLAY AND BACKLIGHT MODULE THEREOF

(75) Inventors: Hsin-Cheng Hong, Tainan County (TW); Kuo-Tsun Huang, Tainan County (TW)

(73) Assignee: Chi Mei Optoelectronics Corp., Tainan County (TW)

( * ) Notice: Subject to any disclaimer, the term of this patent is extended or adjusted under 35 U.S.C. 154(b) by 104 days.

(21) Appl. No.: 10/953,258

(22) Filed: Sep. 29, 2004

(65) Prior Publication Data

US 2005/0083674 A1 Apr. 21, 2005

(30) Foreign Application Priority Data

Oct. 3, 2003 (TW) .............................. 92127393 A
Sep. 27, 2004 (TW) .............................. 93129303 A

(51) Int. Cl.
*F21V 7/04* (2006.01)
(52) U.S. Cl. ..................... 362/623; 362/607; 362/614
(58) Field of Classification Search ............... 362/296, 362/307, 298, 347, 623, 607, 614
See application file for complete search history.

(56) References Cited

U.S. PATENT DOCUMENTS

| | | | | |
|---|---|---|---|---|
| 1,050,466 | A * | 1/1913 | Jones, Jr. .................... 362/303 |
| 4,587,601 | A * | 5/1986 | Collins ........................ 362/235 |
| 4,755,916 | A * | 7/1988 | Collins ........................ 362/236 |
| 6,290,371 | B1 * | 9/2001 | Feger et al. ................. 362/217 |
| 6,312,144 | B1 * | 11/2001 | Li ............................... 362/297 |
| 6,558,032 | B2 * | 5/2003 | Kondo et al. ............... 362/516 |
| 6,641,293 | B2 * | 11/2003 | Kumar et al. ............... 362/539 |
| 6,758,582 | B1 * | 7/2004 | Hsiao et al. ................ 362/302 |
| 6,893,140 | B2 * | 5/2005 | Storey et al. ............... 362/191 |
| 7,093,955 | B2 * | 8/2006 | Sejkora et al. ............. 362/223 |

FOREIGN PATENT DOCUMENTS

| | | |
|---|---|---|
| JP | 2001-013880 | 1/2001 |
| TW | 463955 | 11/2001 |

* cited by examiner

*Primary Examiner*—Sandra O'Shea
*Assistant Examiner*—Jacob Y. Choi
(74) *Attorney, Agent, or Firm*—Thomas, Kayden, Horstemeyer & Risley

(57) ABSTRACT

A liquid crystal display and backlight module. The backlight module comprises a base plate, first reflectors, light sources, second reflectors, diffuser plate and diffuser film. Each first reflector comprises a wave-shaped structure and is provided with a first reflecting surface facing toward the base plate and a focus. Each light source is disposed at the focus of the first reflector and the light beams from the light source reflected by the first reflector pass through the base plate toward the diffusive film in parallel. Each second reflector is disposed on the base plate and provides with a second reflecting surface faced toward the light source. Thus, mura phenomenon and interferences between the two adjacent light sources can be reduced.

31 Claims, 6 Drawing Sheets

LIQUID CRYSTAL DISPLAY AND BACKLIGHT MODULE THEREOF

This application claims two benefits of Taiwan application Serial No. 92127393, filed Oct. 3, 2003 and Taiwan application Serial No. 93129303, filed Sep. 27, 2004, the subject matter of which are incorporated herein by reference.

BACKGROUND OF THE INVENTION

1. Description of the Related Art

The present invention relates to a liquid crystal display and backlight module, and in particular to a backlight module providing a wave reflector to reduce mura phenomenon or interference between two adjacent light sources.

2. Description of the Related Art

In a backlight module, especially in a direct light type backlight module, a flat reflector is applied to reflect light beams from a light tube.

Interference to the reflected light beams and mura phenomenon on adjacent light tubes, however, are often seen in a scanning process because luminous regions of the light beam reflected by the flat reflector tubes are wide and overlapping.

SUMMARY OF THE INVENTION

Accordingly, an object of the invention is to provide a backlight module in an LCD, reducing interference and mura phenomenon between two adjacent light sources.

The invention provides a backlight module for an LCD. The backlight module comprises a base plate, first reflectors, light sources, second reflectors, a diffusive plate, a diffusive film and a diffuser. The base plate is made of transparent material. The first reflector is a wavy reflector disposed on the base plate. The first reflector comprises a first reflecting surface, a parabolic and total-reflecting surface facing the base plate. The light source is disposed on the focus of the parabolic first reflecting surface. As a first initial beam and a second initial beam are reflected by the first reflecting surface, a first reflecting light beam and a second reflecting light beam are formed and pass in parallel through the base plate toward the diffusive plate.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
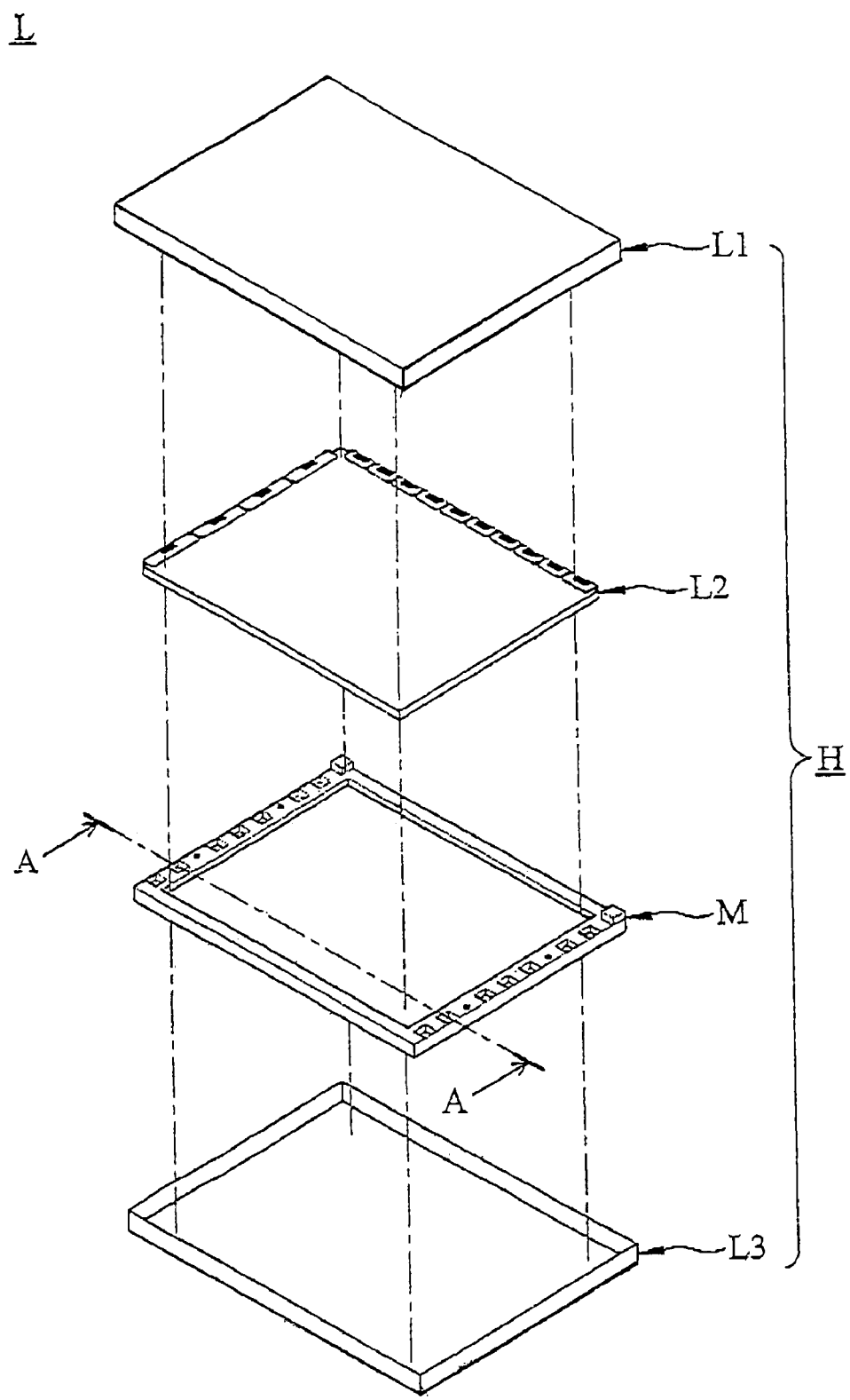
FIG. 1 is an exploded perspective view of a liquid crystal display (L) of the invention, wherein the liquid crystal display (L) comprises a front frame (L1), a panel (L2), a backlight module (M) and a rear frame (L3)

In FIG. 1, a liquid crystal display L comprises a front frame L1, a panel L2, a backlight module M and a rear frame L3. The front frame L1 and the rear frame L3 form a housing of the liquid crystal display L, wherein the panel L2 and the backlight module M are enclosed by the front frame L1 and the rear frame L3.

In the following embodiments, the backlight module M of the invention is a direct light type backlight module, providing a wavy reflector to replace a general flat-type reflector of a backlight module. Brightness of the backlight module M is thus increased and the light beams reflected by the wavy reflector are output in parallel, thus reducing interference and mura phenomenon between two adjacent light sources.

First Embodiment

Figure 2A:
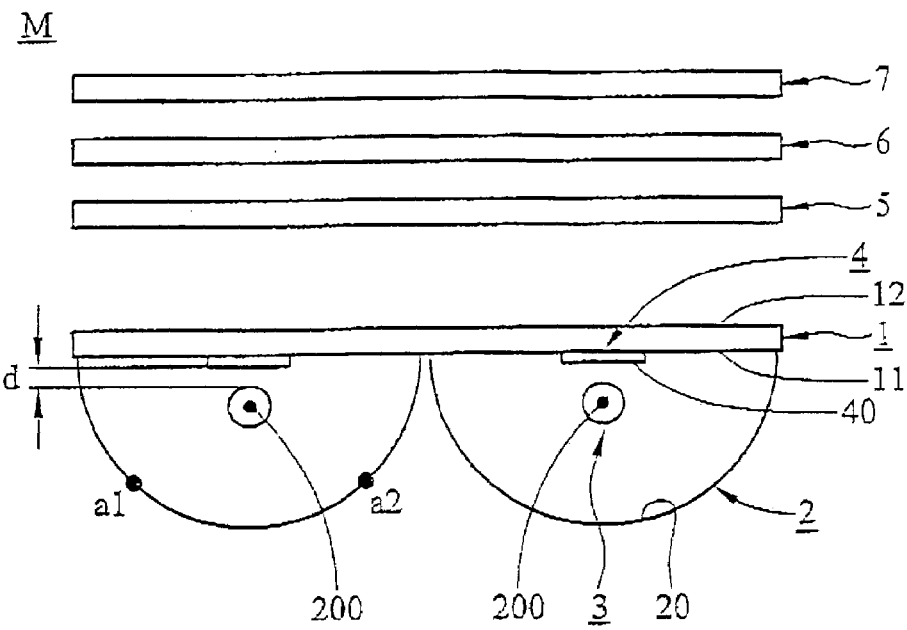
FIG. 2A is a cross-section view according to line (A—A) in FIG. 1 according to a first embodiment of the invention.

Referring to FIG. 2A, in a first embodiment of the invention, a backlight module M comprises a base plate 1 providing two sidewalls 11 and 12, a plurality of first reflectors 2, a plurality of light sources 3, a plurality of second reflectors 4, a diffusive plate 5 and a diffusive film 6. The diffusive plate 5 and the diffusive film 6 are disposed next to the base plate 1 and facing the sidewall 12 of the base plate 1.

In this embodiment, the base plate 1 is made of transparent material, such as acryl resin; the first reflector 2 is wavy reflector, the light source 3 is a light tube, the second reflector 4 is a specular component made of trans-reflective material.

The first reflector 2 and the light source 3 are disposed on one side of the base plate 1, i.e., the first reflector 2 and the light source 3 are facing the sidewall 11 of the base plate 1, and the light source 3 is correspondingly disposed between the base plate 1 and the first reflectors 2.

The first reflector 2 disposed on the sidewall 11 of the base plate 1 comprises a first reflecting surface 20 facing the base plate 1. The first reflecting surface 20 of the first reflector 2 is a parabolic and total-reflecting surface, and a first reference point a1 and a second reference point a2 are two different points randomly defined on the parabolic reflecting surface 20 of the first reflector 2. Based on the mathematical parabolic curve formula, it is understood that the first reference point a1 and the second reference point a2 have a common reference point 200, i.e., the common reference point 200 is a focus of the reflecting surface 20. The light source 3 is disposed on the common reference point 200, located between the base plate 1 and the first reflector 2.

The second reflector 4 disposed on the base plate 1 provides a second reflecting surface 40 facing the light source 3. The second reflecting surface 40 of the second reflector 4 is a flat and total-reflecting surface, and a distance d exists between the second reflecting surface 40 of the second reflector 4 and the outer surface of the light source 3.

Figure 2B:
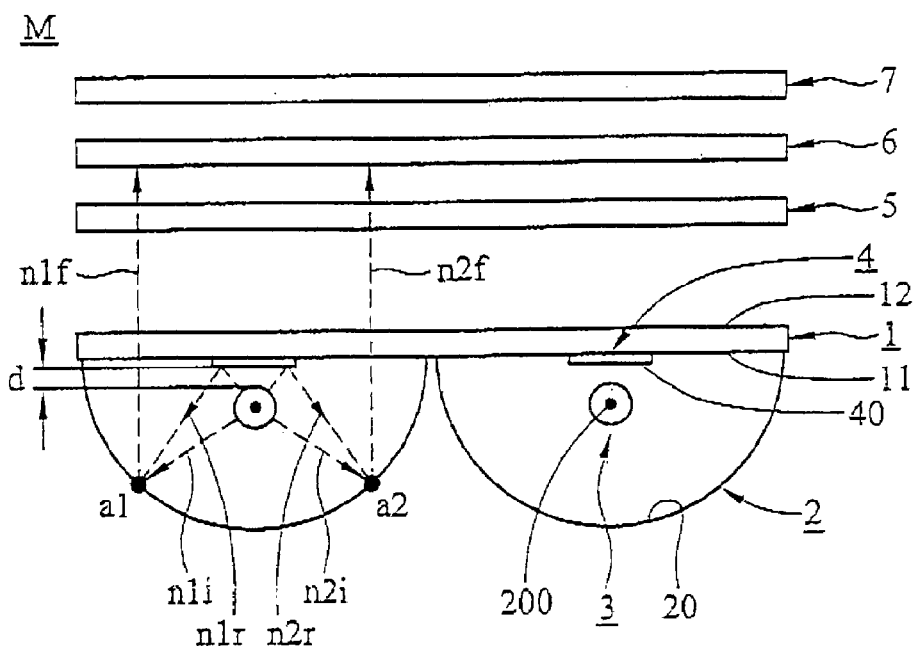
FIG. 2B is an analysis diagram of two optical paths of the first embodiment of FIG. 2A.

Additionally, isolating the light sources 3 from each other by the acrylic base plate 1 prevents rising-heat from the light sources 3 from damaging as the backlight module M is vertically disposed. To prevent the acrylic base plate 1 from overheating due to the light sources 3 or sub-cooling on the light sources 3, and to obtain superior quality from the light beams reflected by the second reflectors 4, a distance d preferably of between 0 to 10 mm, is maintained.

in FIG. 2B, two major paths taken by the light beam output from the light source 3 are depicted as following.

One path of the light beam output from the light source 3 is directly formed by the reflection of the first reflector 2 and passes through the base plate 1 toward the diffusive plate 5. A first initial beam n1*i* and a second initial beam n2*i* from the light source 3 are respectively reflected at the first and second reference points a1, a2 of the reflecting surface 20 of the first reflector 2 to form a first reflecting light beam n1*f* and a second reflecting light beam n2*f* passing through the base plate 1 moving toward the diffusive plate 5 and the diffusive film 6. The first and second reflecting light beams n1*f*, n2*f* are substantially parallel to each other when passing the base plate 1.

Another path of the light beam output from the light source 3 is sequentially formed by the reflection of both the second reflector 4 and the first reflector 2, passing through the base plate 1 toward the diffusive plate 5. For a better understanding of this path, two light beams from the light source 3 are also defined to be reflected at the first and second reference points a1, a2 of the reflecting surface 20 of the first reflector 2.

Two reflecting light beams n1*r*, n2*r*, reflected by the second reflecting surface 40 of the second reflector 4 according to two initial beams from the light source 3, are respectively reflected at the first and second reference points a1, a2 of the reflecting surface 20 of the first reflector 2 to form a first reflecting light beam n1*f* and a second reflecting light beam n2*f* to move toward the diffusive plate 5 and the diffusive film 6. The first and second reflecting light beams n1*f*, n2*f* are substantially parallel to each other as passing the base plate 1.

With the second reflecting surface 40 of the second reflector 4 facing the light source 3, the light beams (n1*r*, n2*r*), from the light source 3 and reflected by the second reflecting surface 40 of the second reflector 4, are reflected again by the reflecting surface 20 of the first reflector 2, i.e., the light beams (n1*r*, n2*r*) reflected by the second reflecting surface 40 of the second reflector 4 are reused to prevent mura phenomenon or interference on images projected from the backlight module M.

It is noted that the second reflecting surface 40 of the second reflector 4 is preferably a flat and total-reflecting surface for increasing brightness and reflective rate. However, if mura phenomenon or interference still occurs on images projected from the backlight module M, the second reflector 4 is preferably made of a trans-reflective material capable of preventing mura phenomenon and interference.

Second Embodiment

Figure 3A:
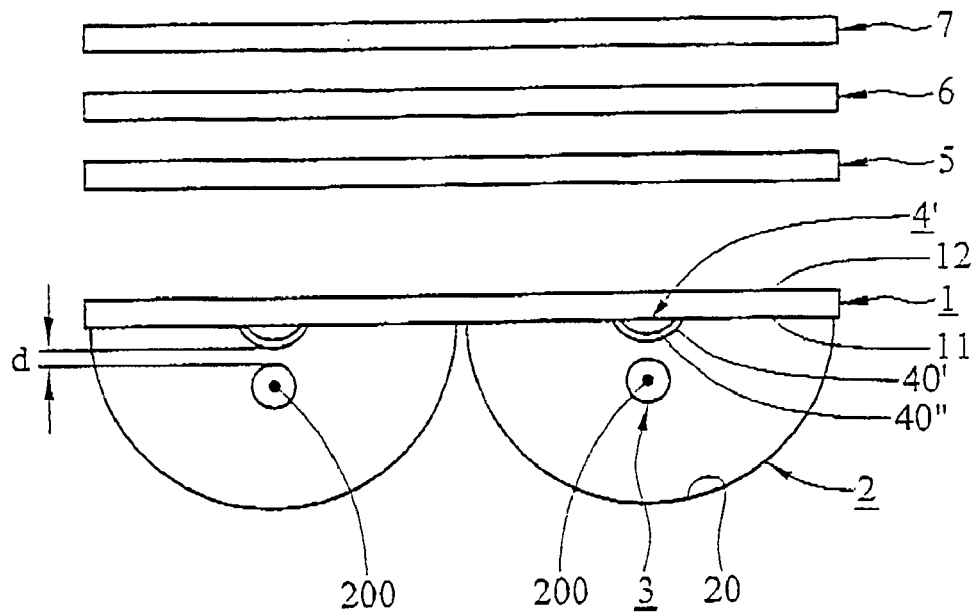
FIG. 3A is a cross-section view according to line (A—A) in FIG. 1 according to a second embodiment of the invention.

Referring to FIG. 3A, in a second embodiment of the invention, a backlight module M' disposed on the base plate 1 comprises a second reflector 4'. The second reflector 4' is a specular component having a second reflecting surface 40' and a third reflecting surface 40".

The second reflector 4' differs from the second reflector 4 in that the second reflecting surface 40' and the third reflecting surface 40" are two parabolic total-reflecting surfaces, and the second reflecting surface 40' faces the light source 3 and the third reflecting surface 40" is formed opposite to the second reflecting surface 40', i.e., the second reflecting surface 40' faces the diffusive plate 5.

A distance d' measured from the second reflecting surface 40 of the second reflector 4 to the outer surface of the light source 3 is between 0 to 10 mm.

Figure 3B:
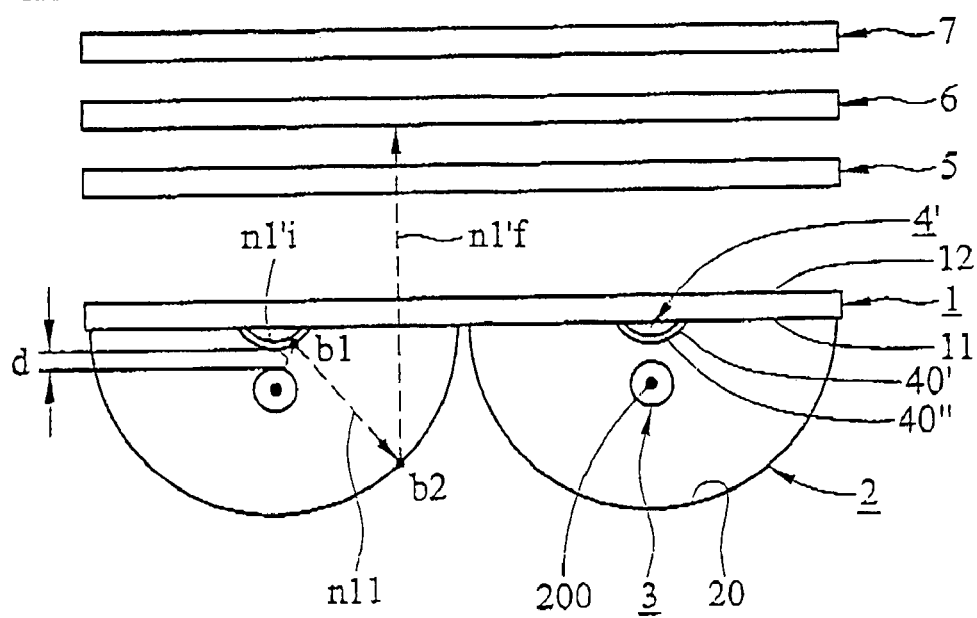
FIG. 3B is an analysis diagram of an optical path of the second embodiment of FIG. 3A.

In FIG. 3B, a first initial beam n1'*i* from the light source 3 is reflected by the second reflecting surface 40' to form a beam n11, and then the light beam n11 is reflected by the first reflecting surface 20 at the point b2 to form a first reflecting light beam n1'*f*. The first reflecting light beam n1'*f* then passes through the base plate 1 moves toward the diffusive plate 5 and the diffusive film 6. The first reflecting light beam n1'*f* in FIG. 3B is substantially parallel to the first and second reflecting light beams n1*f*, n2*f* in FIG. 2B.

Thus, all beams emitted from the light sources 3 are properly reflected by the first reflecting surface 20 of the first reflector 2 to pass through the base plate 1 in parallel.

Figure 4:
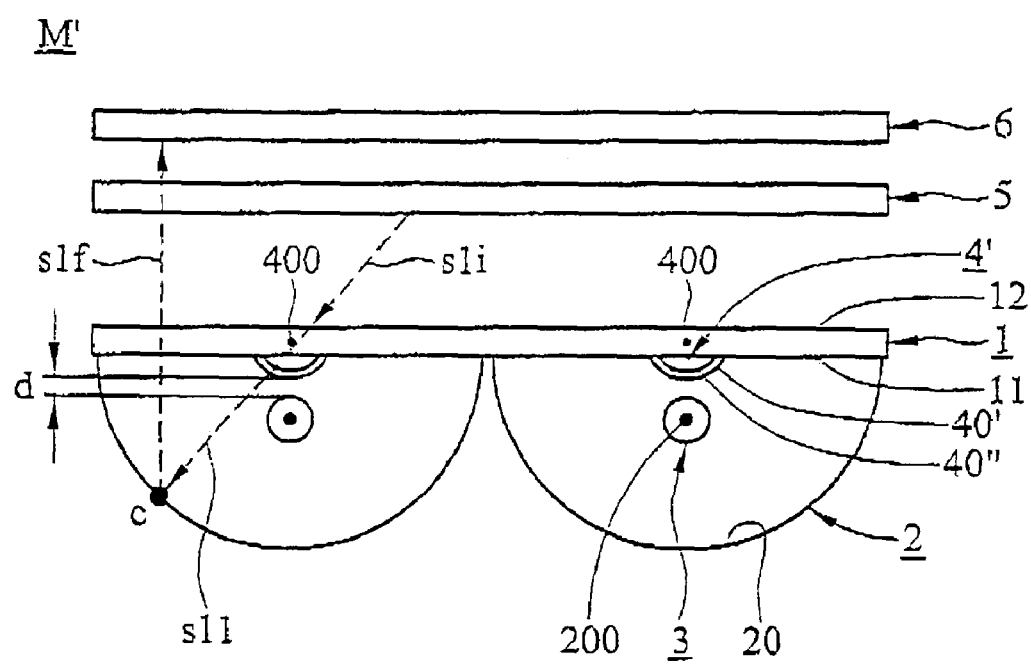
FIG. 4 is another analysis diagram of an optical path of the second embodiment of FIG. 3A.

FIG. 4 is an analysis diagram of anther optical path of the second embodiment of FIG. 3A. In this case, the second reflector 4' is made of trans-reflective material.

As a light beam s1*i*, transmitted from the diffusive plate 5, passes through the base plate 1, the light beam s1*i* passes directly through the second reflector 4' to form a light beam s11, and light beam s11 is then reflected by the first reflecting surface 20 of the first reflector 2 at a point c to form a reflecting light beam s1*f* passing through the base plate 1. The reflecting light beam s1*f* in FIG. 4 is substantially parallel to the first and second reflecting light beams n1*f*, n2*f* in FIG. 2B.

Figure 5A:
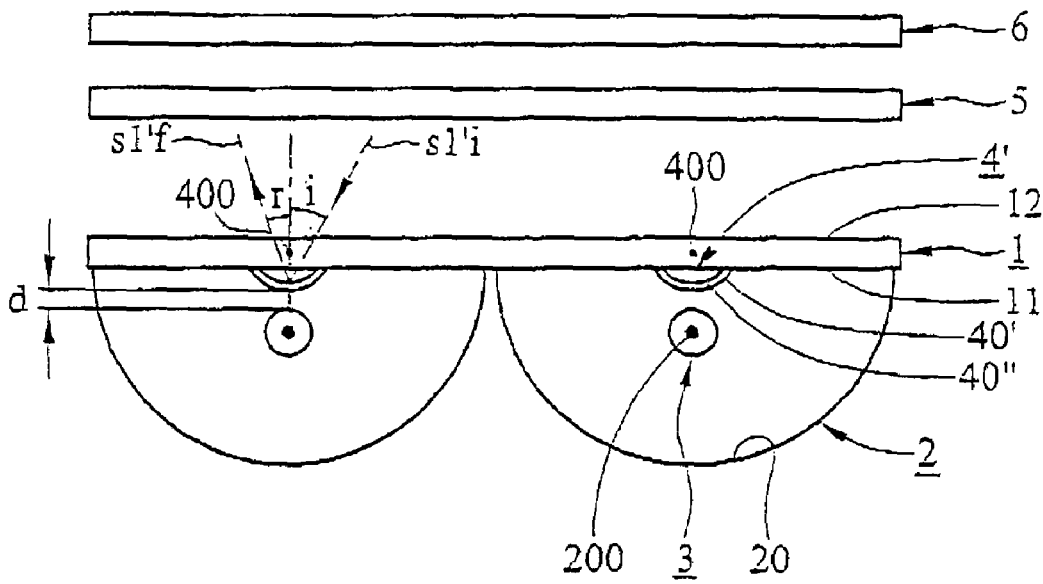
FIG. 5A is another analysis diagram of an optical path of the second embodiment of FIG. 3A.
Figure 5B:
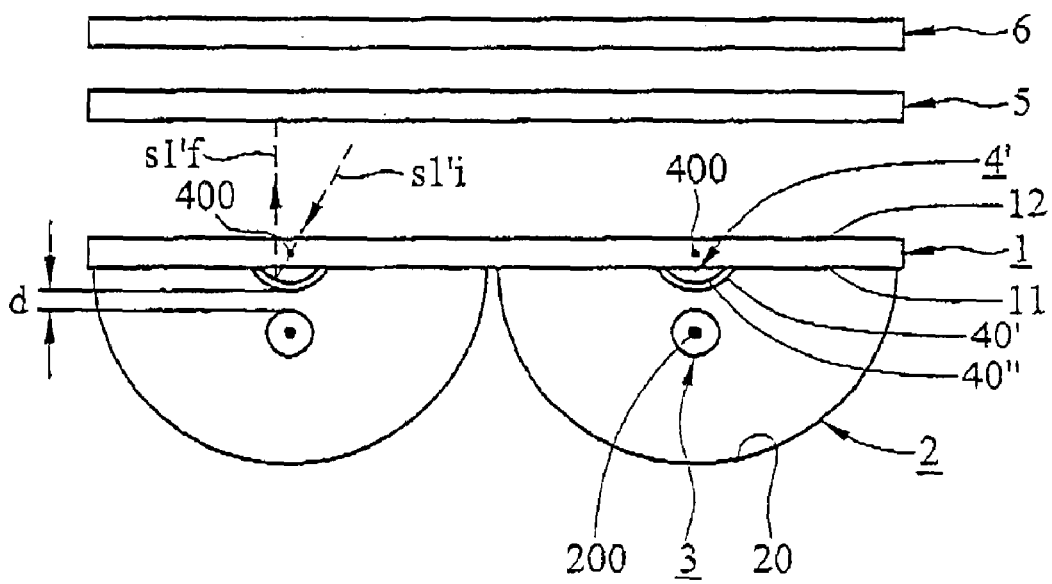
FIG. 5B is another analysis diagram of an optical path of the second embodiment of FIG. 3A.

FIGS. 5A, 5B are analysis diagrams of two optical paths of light beams reflected by the third reflecting surface 40" of the second reflector 4'.

In FIG. 5A, a reference coordinate 400a is a symmetrical plane passing the focus 400 of the parabolic reflecting surface 40" of the second reflector 4', substantially perpendicular to the longitudinal direction of the base plate 1. In this case, an incident angle "i" is the same as a reflection angle "r" with respect to the reference coordinate 400a.

As a light beam s1'*i* transmitted from the diffusive plate 5, not passing the focus 400, inclined the reference coordinate 400a with incident angle "i", is reflected by the third reflecting surface 40" of the second reflector 4' to form a reflecting light beam s1'*f*, inclined the reference coordinate 400a with the reflection angle "r", the propagation direction of the reflecting light beam s1'*f* is not perpendicular to the longitudinal direction of the diffusive plate 5.

In FIG. 5B, as a light beam s1"*i* transmitted from the diffusive plate 5 passes the focus 400, the light beam s1"*i* is reflected by the third reflecting surface 40" of the second reflector 4' to form a reflecting light beam s1"*f*, the propagation direction of the reflecting light beam s1"*f* is substantially perpendicular to the longitudinal direction of the diffusive plate 5, i.e., the reflecting light beam s1"*f* is substantially parallel to the reflecting light beam s1*f* in FIG. 4.

The third reflecting surface 40" of the second reflector 4' reflects the light beams transmitted from the diffusive plate 5, mura phenomenon or interference generated by the light sources 3 are reduced.

Third Embodiment

Figure 6:
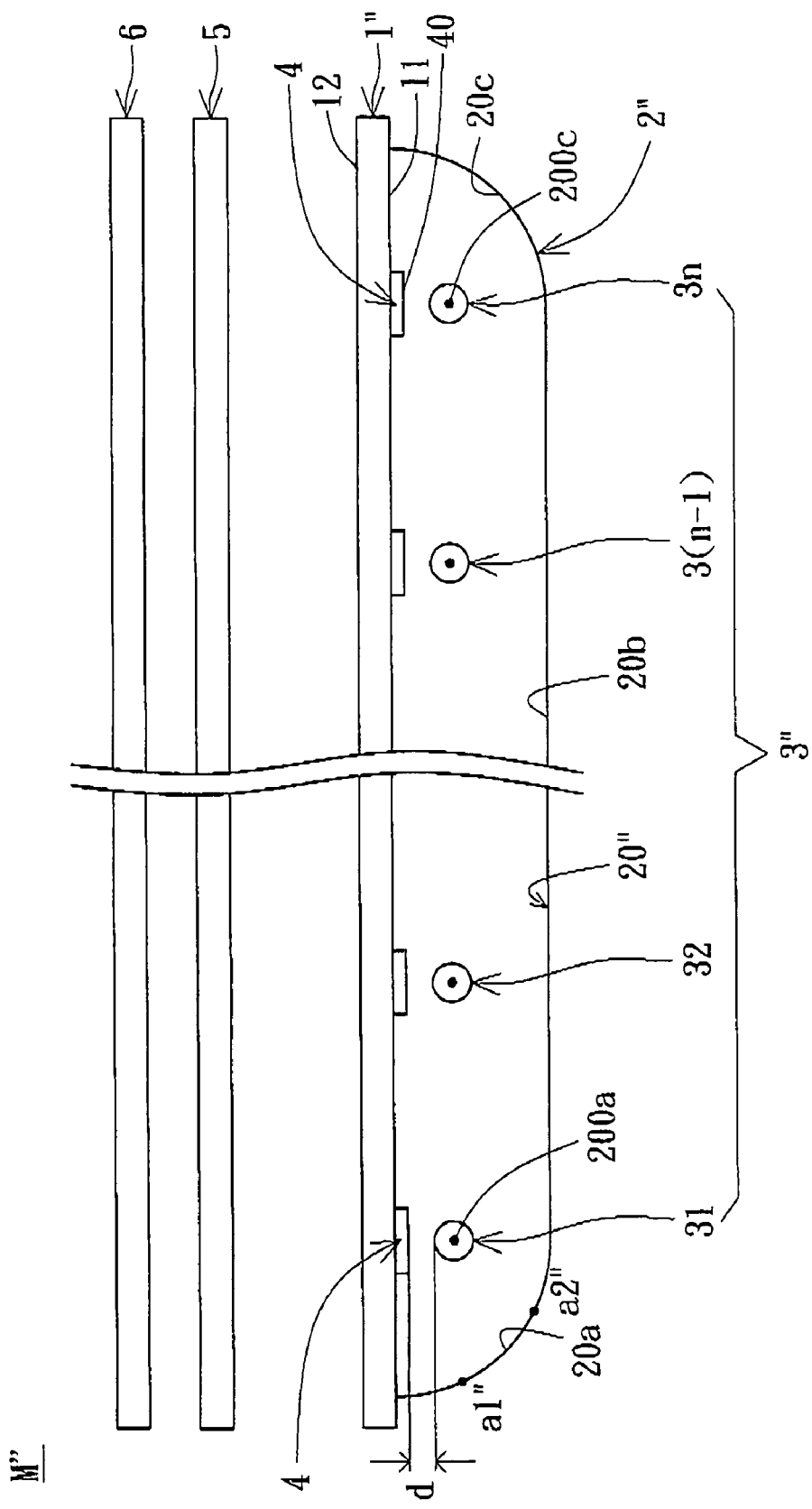
FIG. 6 is a cross-section view according to line (A—A) in FIG. 1 according to a third embodiment of the invention.

Referring to FIG. 6, in a third embodiment of the invention, a backlight module M" comprises a base plate 1", a first reflector 2", a light source 3", at least two second reflectors 4, a diffusive plate 5 and a diffusive film 6. The first reflector 2" comprises a first reflecting surface 20" facing the base plate 1".

The backlight module M" differs from the backlight module M in that the first reflecting surface 20" of the first reflectors 2" is a substantially U-shaped surface comprising a pair of asymmetrical, parabolic segments 20a, 20c and a flat segment 20b disposed therebetween. The parabolic segment 20a provides a first reference point a1" and a second reference point a2", and the first reference point a1" and the second reference point a2" have a common reference point (focus) 200a. The light source 3" disposed between the base plate 1" and the first reflector 2" comprises at least two light tubes 31, 32, ..., 3(n-1) and 3n, wherein the light tubes 31 and 3n are respectively disposed on the focuses 200a and 200c of the parabolic segments 20a and 20c, and the light tubes 32, ..., 3(n-1) are lined up between the light tubes 31 and 3n.

As the light tubes 31, 32, ..., 3(n-1) and 3n of the light source 3" are simultaneously actuated, light beams formed therefrom are reflected by the segments 20a, 20b and 20c of the first reflecting surface 20" and then pass in parallel through the base plate 1" toward the diffusive plate 5 accordingly.

In the embodiment, only one the light source 3" is shown. In a preferred embodiment, the number of the light source 3" of the backlight module M" can be larger than one, and each of which is individually and sequentially actuated. It is preferably that the second reflector 4 can also be replaced by the reflector 4' of the backlight module M' in the second embodiment.

While this invention has been described in connection with what is presently considered to be the most practical and preferred embodiment, it is to be understood that the invention is not limited to the disclosed embodiments, but, on the contrary, is intended to enclose various modifications and equivalent arrangements included within the spirit and scope of the appended claims.

What is claimed is:

1. A backlight module, comprising:
   a base plate;
   a first reflector comprising a first reflecting surface facing the base plate;
   a light source disposed between the base plate and the first reflector, emitting a first initial beam directly onto the first reflecting surface for being reflected by the first reflecting surface to form a first reflecting light beam and a second initial beam being reflected by the first reflecting surface to form a second reflecting light beam, wherein the first reflecting light beam and the second reflecting light beam substantially pass through the base plate in parallel; and
   a second reflector provided with a second reflecting surface facing the light source and a third reflecting surface opposite to the second reflecting surface, wherein the second reflecting surface and the third reflecting surface of the second reflector are total-reflecting surfaces, wherein the backlight module further comprises a third initial beam from a diffusive plate, the third initial beam is reflected by the third reflecting surface to form a third reflecting light beam, wherein the third reflecting light beam passes through the base plate.

2. The backlight module as claimed in claim 1, wherein the second reflecting surface of the second reflector is substantially a parabolic surface.

3. The backlight module as claimed in claim 1, wherein the first reflecting surface is substantially a parabolic surface having a focus.

4. The backlight module as claimed in claim 3, wherein the light source is disposed on the focus of the first reflecting surface.

5. The backlight module as claimed in claim 3, wherein the third reflecting surface of the second reflector is substantially a parabolic surface having another focus.

6. The backlight module as claimed in claim 5, wherein the third initial beam from the diffusive plate passes through the another focus, the third initial beam, and the third reflecting light beam passes through the base plate and substantially perpendicular to a longitudinal direction of the base plate.

7. The backlight module as claimed in claim 1, wherein the base plate is made of transparent material.

8. The backlight module as claimed in claim 1, wherein the second initial beam is sequentially reflected by the second reflecting surface and the first reflecting surface to form the second reflecting light beam passing through the base plate.

9. The backlight module as claimed in claim 1, wherein the second reflecting surface is substantially a flat surface.

10. The backlight module as claimed in claim 1, wherein the second reflecting surface of the second reflector is substantially a parabolic surface.

11. The backlight module as claimed in claim 1, wherein the diffusive plate facing a sidewall of the base plate, the third reflecting surface facing an opposite sidewall of the base plate.

12. The backlight module as claimed in claim 1, wherein the diffusive plate is disposed next to the base plate.

13. The backlight module as claimed in claim 1 further comprising a diffusive film, wherein the diffusive plate and the diffusive film are disposed next to the base plate.

14. The backlight module as claimed in claim 1, wherein the first reflecting surface of the first reflector comprises at least two segments, and wherein the light source comprises at least two light tubes, which are disposed between the base plate and the at least two segments respectively, for being simultaneously actuated.

15. The backlight module as claimed in claim 14, wherein the at least two segments are parabolic.

16. The backlight module as claimed in claim 15, wherein the at least two light tubes are disposed on the focuses of the at least two segments.

17. A backlight module. comprising:
   a base plate;
   a first reflector comprising a first reflecting surface facing the base plate;
   a light source disposed between the base plate and the first reflector; emitting a first initial beam directly onto the first reflecting surface for being reflected by the first reflecting surface to form a first reflecting light beam and a second initial beam being reflected by the first reflecting surface to form a second reflecting light beam, wherein the first reflecting light beam and the second reflecting light beam substantially pass through the base plate in parallel; and
   a second reflector provided with a second reflecting surface facing the light source and a third reflecting surface opposite to the second reflecting surface, wherein the second reflector is made of trans-reflective material, and the backlight module further comprises a third initial beam from a diffusive plate, the third initial beam is reflected by the first reflecting surface to form a third reflecting light beam, wherein the third reflecting light beam passes through the base plate.

18. The backlight module as claimed in claim 17, wherein the first reflecting surface is substantially a parabolic surface having a focus.

19. The backlight module as claimed in claim 18, wherein the third reflecting surface of the second reflector is substantially a parabolic surface having another focus.

20. The backlight module as claimed in claim 19, wherein the third initial beam from the diffusive plate passes through the another focus, the third initial beam, and the third reflecting light beam passes through the base plate and substantially perpendicular to a longitudinal direction of the base plate.

21. The backlight module as claimed in claim 18, wherein the light source is disposed on the focus of the first reflecting surface.

22. The backlight module as claimed in claim 17, wherein the base plate is made of transparent material.

23. The backlight module as claimed in claim 17, wherein the second initial beam is sequentially reflected by the second reflecting surface and the first reflecting surface to form the second reflecting light beam passing through the base plate.

24. The backlight module as claimed in claim 17, wherein the second reflecting surface is substantially a flat surface.

25. The backlight module as claimed in claim 17, wherein the second reflecting surface of the second reflector is substantially a parabolic surface.

26. The backlight module as claimed in claim 17, wherein the diffusive plate facing a sidewall of the base plate, the third reflecting surface facing an opposite sidewall of the base plate.

27. The backlight module as claimed in claim 17, wherein the diffusive plate is disposed next to the base plate.

28. The backlight module as claimed in claim 17 further comprising a diffusive film, wherein the diffusive plate and the diffusive film are disposed next to the base plate.

29. The backlight module as claimed in claim 17, wherein the first reflecting surface of the first reflector comprises at least two segments, and wherein the light source comprises at least two light tubes, which are disposed between the base plate and the at least two segments respectively, for being simultaneously actuated.

30. The backlight module as claimed in claim 29, wherein the at least two segments are parabolic.

31. The backlight module as claimed in claim 30, wherein the at least two light tubes are disposed on the focuses of the at least two segments.

* * * * *